(12) United States Patent
Beutter et al.

(10) Patent No.: US 6,919,914 B2
(45) Date of Patent: Jul. 19, 2005

(54) POWERED OPTICAL COUPLER AND ENDOSCOPIC VIEWING SYSTEM USING SAME

(75) Inventors: Richard A. Beutter, San Jose, CA (US); Michael Matson, Durham, NC (US)

(73) Assignee: Stryker Corporation, Kalamazoo, MI (US)

( * ) Notice: Subject to any disclaimer, the term of this patent is extended or adjusted under 35 U.S.C. 154(b) by 569 days.

(21) Appl. No.: 10/000,755

(22) Filed: Oct. 24, 2001

(65) Prior Publication Data

US 2003/0076410 A1 Apr. 24, 2003

(51) Int. Cl.⁷ .............................................. H04N 7/12
(52) U.S. Cl. ....................................... 348/65; 600/167
(58) Field of Search ................................ 600/167, 459; 348/42–67, 68, 69, 70, 84, 85, 86, 87; 700/65; H04N 7/18

(56) References Cited

U.S. PATENT DOCUMENTS

| | | |
|---|---|---|
| 4,639,772 A | 1/1987 | Sluyter et al. |
| 4,781,448 A | 11/1988 | Chatenever et al. |
| 4,874,232 A | 10/1989 | Hasegawa |
| 4,934,789 A | 6/1990 | Lemke |
| 4,969,450 A | 11/1990 | Chinnock et al. |
| 5,245,475 A | 9/1993 | Takasugi |
| 5,582,576 A * | 12/1996 | Hori et al. ............... 600/167 |
| 5,808,813 A | 9/1998 | Lucey et al. |
| 5,817,014 A | 10/1998 | Hori et al. |
| 5,957,849 A * | 9/1999 | Munro ...................... 600/459 |
| 6,113,533 A | 9/2000 | Howes et al. |
| 6,155,973 A | 12/2000 | Howes et al. |
| 6,292,221 B1 | 9/2001 | Lichtman |
| 6,425,858 B1 | 7/2002 | Minami |
| 6,490,490 B1 * | 12/2002 | Uchikubo et al. ............ 700/65 |
| 2001/0021797 A1 | 9/2001 | Yamanaka et al. |

FOREIGN PATENT DOCUMENTS

| | | |
|---|---|---|
| EP | 0 651 272 A2 | 5/1995 |
| WO | WO 96/10947 | 4/1996 |

OTHER PUBLICATIONS

PCT Application No. PCT/US02/34221, *International Search*, Aug. 2003.

* cited by examiner

Primary Examiner—Tung Vo
(74) Attorney, Agent, or Firm—Flynn, Thiel, Boutell & Tanis, P.C.

(57) ABSTRACT

An endoscopic viewing system including a powered zoom coupler. The coupler is configured to attach the camera to a proximal end of an endoscope. The coupler includes a plurality of lenses that are positioned within a sleeve. The coupler includes a first motor and a second motor. Each of the first motor and the second motor move at least a portion of the plurality of lenses with respect to the sleeve. The coupler can optically focus and magnify the image applied to a camera.

20 Claims, 11 Drawing Sheets

POWERED OPTICAL COUPLER AND ENDOSCOPIC VIEWING SYSTEM USING SAME

FIELD OF THE INVENTION

This invention relates generally to endoscopic viewing systems and, more particularly, to a powered optical coupler for use with such systems.

BACKGROUND OF THE INVENTION

Whenever possible, surgeons prefer to perform surgery endoscopically. To perform endoscopic surgery, an endoscope is inserted into the body at the surgical site. The endoscope is an elongated tube that allows a surgeon to view the portion of the body into which it is inserted. Other surgical instruments inserted in the body at the surgical site can be manipulated based on what the surgeon views through the endoscope. The development of endoscopes, as well as their companion instruments, has made it possible to perform minimally invasive surgery. In this type of surgery, the need to make large incisions to gain access to the surgical site has been eliminated. Instead, the surgeon can insert an endoscope and other equipment through small openings in the body, called portals. One advantage to endoscopic surgery is that since the incisions are smaller, the portions of the body that need to heal after surgery are reduced. Additionally, because less of the internal tissue of the patient is open to the environment, the extent to which the patient's tissues and organs are open to infection is reduced.

Initially, endoscopes included only an eyepiece, through which the surgeon could view the surgical site. A modern endoscope system includes a camera assembly that has a camera head attached to the proximal end of the endoscope. A signal processor receives output signals from the camera head. The output signals are converted by the signal processor into electronic signals that are displayed on a monitor. By providing this type of system, the surgeon and other personnel in the operating room can readily view the surgical site by observing the monitor.

Typically, a lens assembly is included in the endoscopic system between the proximal end of the endoscope and the camera head. The lens assembly is fitted in a coupler attached to the proximal end of the endoscope. The lens assembly includes one or more lenses that are moved to focus the image on a transducer internal to the camera head. The lens assembly may also include one or more lenses that are moved to selectively magnify the image.

The camera assemblies of modern endoscope assemblies are also capable of processing the output signals generated by their camera heads in order to display the images desired by a surgeon. Specifically, these assemblies are capable of magnifying a portion of the received output signals in order to produce an enlarged image of a section of the surgical site. One such system is disclosed in U.S. Pat. No. 6,224,542, entitled, Endoscopic Camera System With Non-Mechanical Zoom, issued on May 1, 2001, which is incorporated herein by reference.

These assemblies are also capable of enhancing the received camera head output signals in order to facilitate the generation of an image in which the features of the captured images are clearly presented on the camera display. One such system for enhancing the captured image is disclosed in the Applicants' Assignee's U.S. Pat. No. 6,533,721, issued Mar. 18, 2003, entitled ENDOSCOPIC CAMERA SYSTEM WITH AUTOMATIC NON-MECHANICAL FOCUS, filed Jul. 27, 2001 and incorporated herein by reference.

During a surgical procedure, the surgeon may want to periodically modify the magnification, the field of view, of the surgical site that is displayed on the monitor. In order to accomplish this task, it is often necessary for the surgeon or the operating room personnel to alternatively adjust the position of the lenses internal to the coupler and the magnification setting of the video signal processor. The time and concentration required to make these adjustments, both lengthens time needed to perform the surgical procedure and diverts attention from the surgical procedure.

Also, sometimes during the course of a surgical procedure, the quality of the image of the surgical site presented by the endoscope system may deteriorate. This may necessitate having to readjust the position of the lenses internal to the coupler and/or the video image processing performed by the camera position. Again, having the surgeon or other surgical personnel perform these tasks can divert attention away from the actual surgical procedure the surgeon is attempting to perform and can lengthen the overall time it takes for the procedure to be performed. This runs contrary to one of the goals of modern surgery which is to perform the surgical procedure as quickly as possible in order to minimize the amount of time a patient must spend under anesthetic.

SUMMARY OF THE INVENTION

This invention is directed to a new and useful endoscopic viewing system with a powered zoom coupler. The endoscopic viewing system includes a camera. The coupler is configured to attach the camera to a proximal end of an endoscope. A monitor is included and can display an image detected by the camera. The coupler includes a plurality of lenses that are positioned within a sleeve. The coupler includes a first motor and a second motor. Each of the first motor and the second motor move at least a portion of the plurality of lenses with respect to the sleeve. The coupler can optically focus and magnify the image. The system of this invention includes a control console that both regulates the setting of the lenses in the coupler and the processing of the video signals generated by the camera. The control center digitally focuses and magnifies the image.

Owing to the structure of this endoscopic viewing system, surgeons can, with a single control unit optically and electrically process an image displayed on the monitor. Since the image can be both digitally and optically altered, wider zoom and focus ranges are possible. Additionally, there is no need to remove and reposition the endoscope if the image is moved too far out of focus, as in some previous endoscopic systems. In addition, the power zoom coupler of this invention is easy to use and can quickly bring objects into better zoom or focus. Since manual control is not required to magnify and/or adjust the focus of images of the surgical site, time expended by the surgical team can be reduced. Further, the overall size of the coupler is equivalent to that of previous couplers. Thus, the coupler can be utilized with existing endoscopes and cameras without the need for adapters.

BRIEF DESCRIPTION OF THE DRAWINGS

This invention is pointed out with particularity in the accompanying claims. The above and further features and benefits of this invention are better understood by reference to the following detailed description, as well as by reference to the following drawings in which:

DETAILED DESCRIPTION

Figure 1:
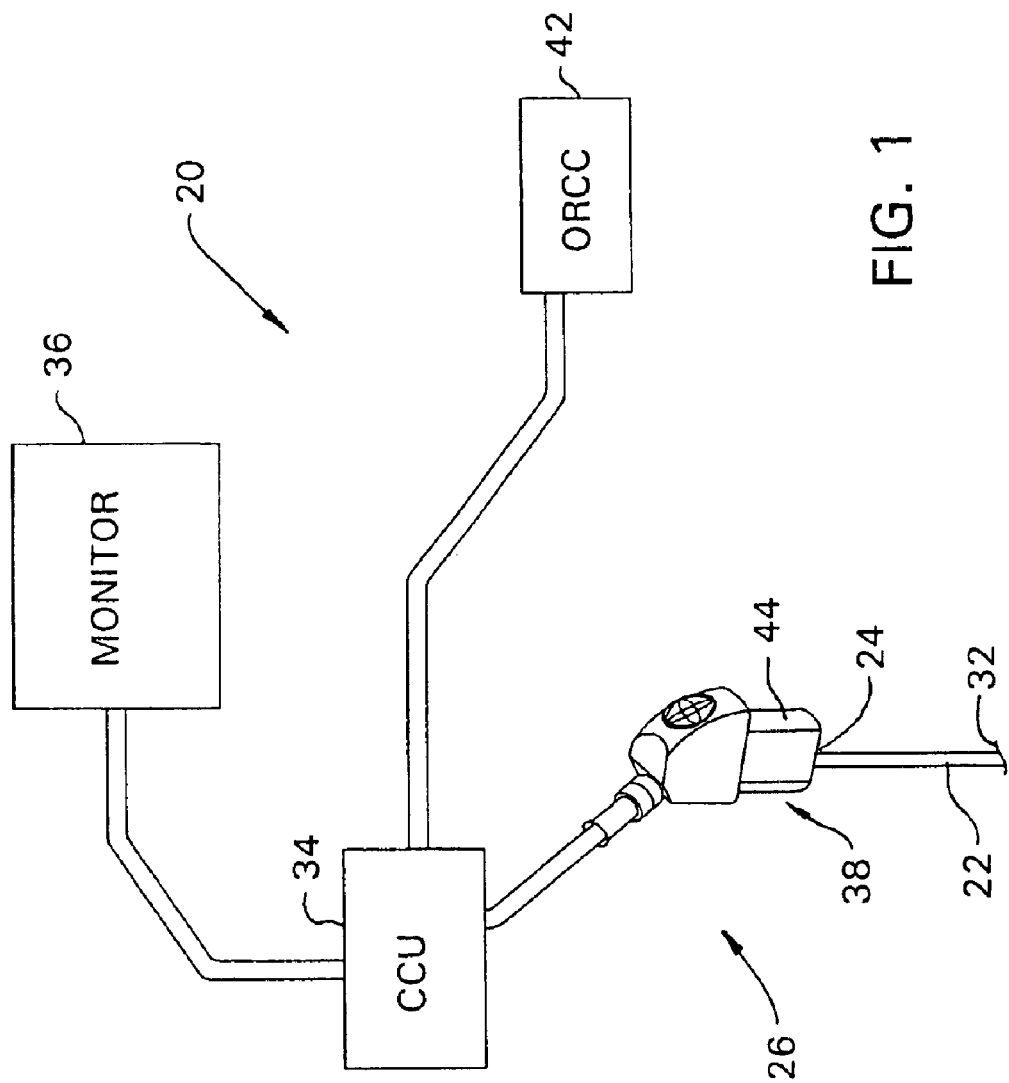
FIG. 1 is an isometric view of an endoscopic system according to the present invention.

Referring to FIG. 1 there is illustrated an endoscopic viewing system 20 according to the present invention. The endoscopic viewing system 20 includes an endoscope 22 and a camera system 26 that is coupled to a proximal end 24 of the endoscope 22. The endoscope is inserted in the body through a portal 32. The camera system 26 itself consists of a camera head 28 (FIG. 2) that is physically attached to the endoscope 22.

Internal to the camera head 28 is a transducer 29 that converts the light rays forming the image at the surgical site into video output signals. In one version of the invention, transducer 29 includes a prism assembly that initially splits the image applied to it into three red/green/blue primary color components. The individual components of the image are applied to separate charge coupled devices (CCDs). The individual red/green/blue video output signals from transducer 29 are applied to a camera control unit 34. The camera control unit 34 converts the video output signals from the camera head 28 into a display signal. The camera control unit 34 is capable of selectively enlarging, zooming, portions of the image captured by the camera head 28 in order to provide a magnified display of those images.

The display signals generated by the camera control unit 34 are applied to a monitor 36 on which the image the surgeon wants to view is displayed. The camera control unit 34 is also capable of bringing the image displayed on the monitor 36 into focus. One such camera system 26 that can be incorporated into the endoscopic viewing system 20 of this invention is the 988 3-chip camera, manufactured by the Applicant's Assignee, Stryker Endoscopy of Santa Clara, Calif. This system is disclosed in U.S. Pat. No. 6,533,721 entitled ENDOSCOPIC CAMERA WITH AUTOMATIC NON-MECHANIC FOCUS.

Camera head 28 is mounted to the proximal end 24 of the endoscope 22. Incorporated into the camera head 28 is a powered zoom coupler 38. As described below, the coupler 38 contains lenses that are moved in order to focus the image applied to the camera head transducer. The lenses are also selectively movable to enlarge the image applied to the camera head transducer. Coupler 38 also includes one or more motors 128 and 138 (FIGS. 2 and 8, respectively) that selectively move the lenses. The power signals that cause the motors to operate are generated by the camera control unit 34. The camera control unit 34 receives signals from the coupler 38 indicating relative position of the lenses.

A surgeon may regulate the image of the surgical site displayed by the endoscopic viewing system 20 with an operating room control center 42. In response to touchscreen or voice generated commands, the operating room control center 42 generates control signals to the camera control unit 34. Based upon signals received from the control center 42, the camera control unit 34 sets the lenses internal to the coupler 38 for the appropriate level of magnification. Alternatively, based on commands received from control center 42, the camera control unit 34 will reset the lenses to refocus the image presented to the transducer 29 or to be appropriately positioned. Based upon the received control center commands, camera control unit 34 will also process the signals received from the camera head transducer 29 to digitally enhance, focus and/or selectively enlarge the final version of the captured image that is presented on monitor 36.

Figure 2:
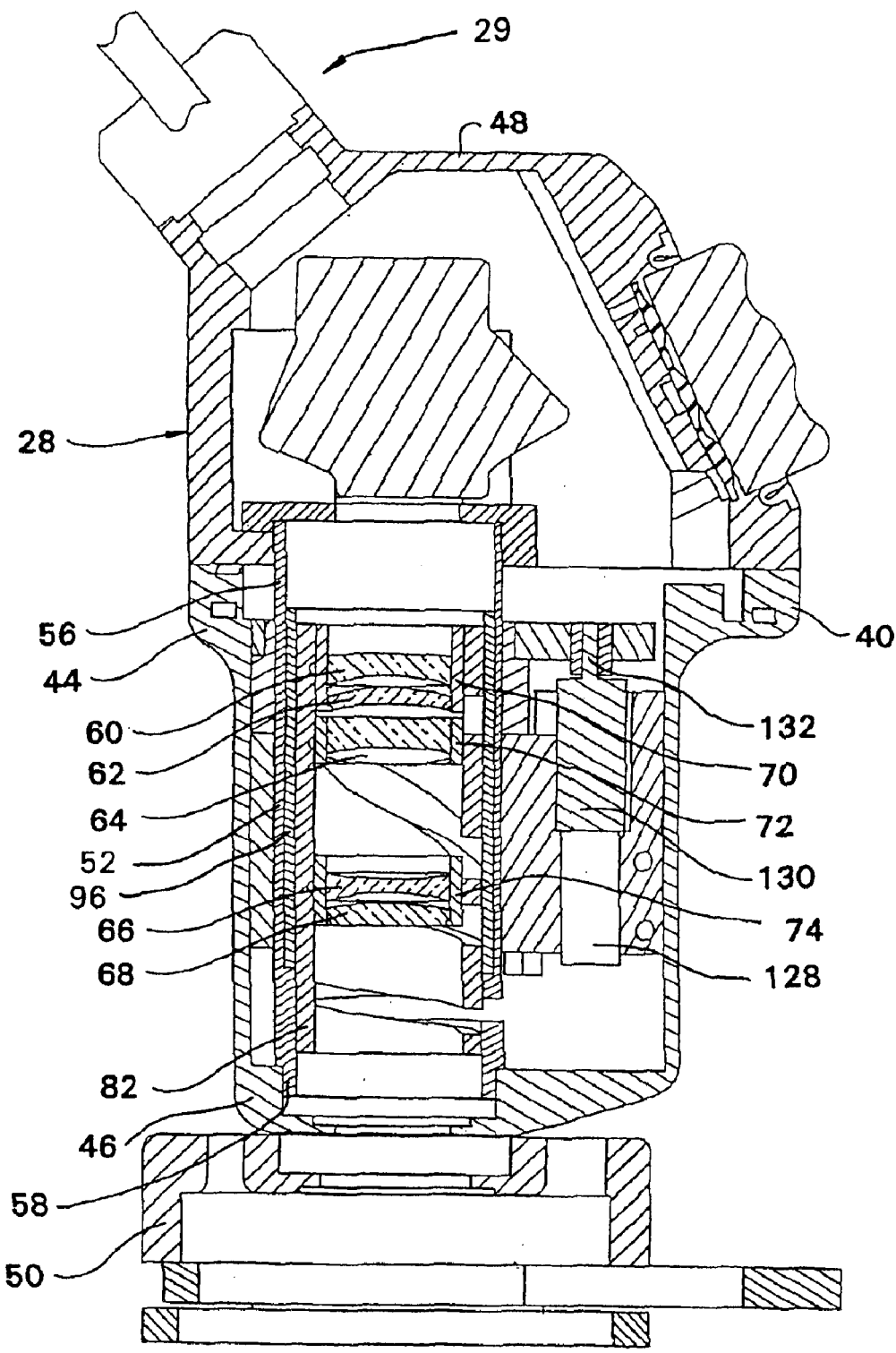
FIG. 2 is a side view of the power zoom coupler of FIG. 1.
Figure 3:
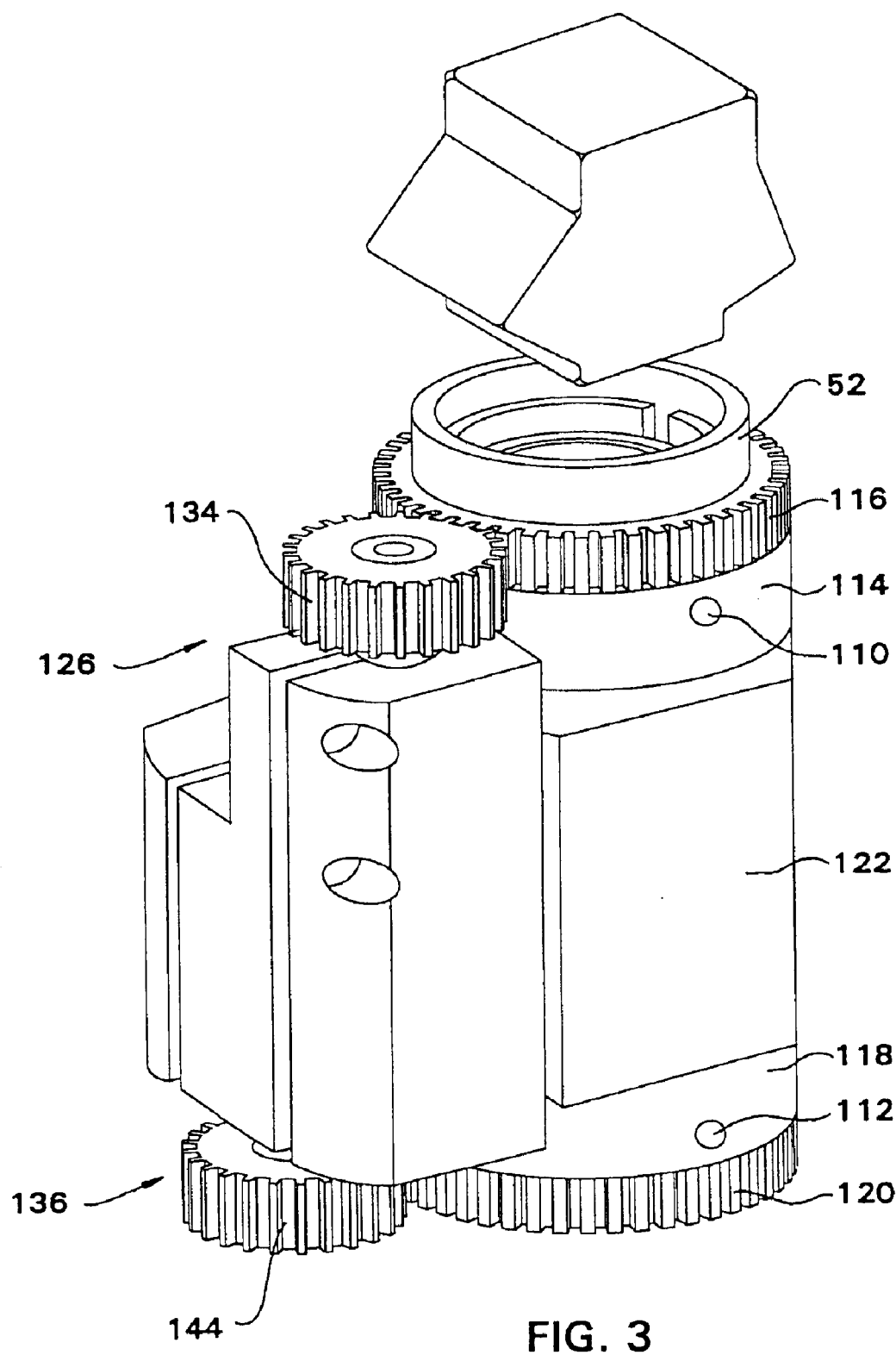
FIG. 3 is an isometric view of power zoom coupler according to the present invention without the outer housing.

As seen in FIGS. 2 and 3, the camera head 28 includes a case 40. A clamp 50 is attached to a distal end 46 of the case 40 for releasably attaching the camera head 28 to the proximal end of endoscope 22. Positioned within the case 40 are the transducer 29 and the coupler 38.

Coupler 38 includes a main sleeve 52 that has a longitudinal axis 54. A plurality of lenses 60, 62, 64, 66 and 68 are movably positioned within the main sleeve 52. The lenses 60–68 move with respect to the main sleeve 52 and with respect to each other. As depicted, from the proximal end of the main sleeve, the first lens 60 is a concave lens, the second lens 62 is a positive meniscus lens, the third lens 64 is a bi-convex lens, the fourth lens 66 is a bi-concave lens and the fifth lens 68 is a bi-convex lens. Lenses 60–68 are shaped such that when they move with respect to each other and with respect to the main sleeve 52, the magnification of the image applied to transducer 29 changes. When the lenses 60–68 move only with respect to the main sleeve 52, the focus of the image presented on the surface of the camera head transducer 29 is altered.

The five lenses 60–68 are supported in the coupler 38 by three ring-shaped lens holders. The first lens 60 and the second lens 62 are attached to a first lens holder 70. The first lens holder 70 includes a radially outwardly directed pin 76. A second lens holder 72 supports the third lens 64. Included on the second lens holder 72 is a pin 78. The fourth lens 66 and the fifth lens 68 are attached to a third lens holder 74. The third lens holder 74 includes a pin 80.

The lens holders 70–74 are movably supported by a lens sleeve 82 located in the main sleeve 52. The lens sleeve 82, seen in FIG. 4, moves axially along the longitudinal axis 54. As described below, the coupler 38 is configured to prevent the lens sleeve 82 from rotating about the longitudinal axis 54. The lens sleeve 82 has a proximal end 84 and a distal end 86. The lens sleeve 82 defines four helical slots, each of which extends around half of the circumference of the sleeve. Extending from the proximal end 84 to the distal end 86, these slots include a first slot 88, a second slot 90, a third slot 92 and a fourth slot 94.

The pin 76 extends through the first slot 88 and couples the first lens holder 70 to the lens sleeve 82. The pin 78 extends through the second slot 90 and couples the second lens holder 72 to the lens sleeve 82. The pin 80 extends through the third slot 92 and couples the third lens holder 74 to the lens sleeve 82. Each slot 88–92 is sized to allow the respective pin 76–80 to slide therein.

Figure 4:
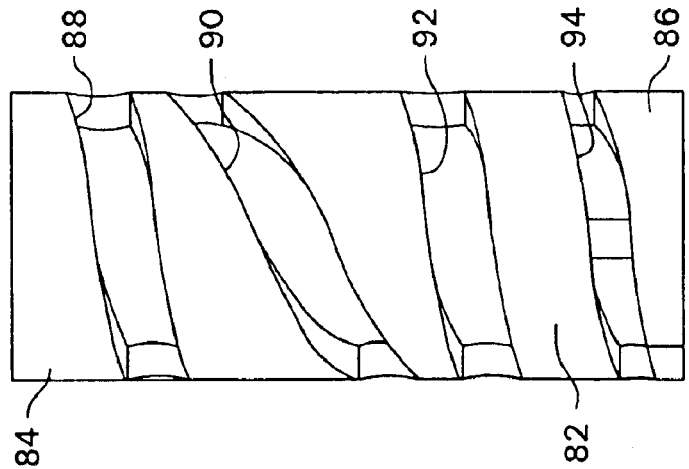
FIG. 4 is a side view of the lens sleeve of the power zoom coupler of FIG. 2.

As best illustrated in FIG. 4, slots 88–92 have first ends that terminate along a first line extending the length of the lens sleeve 82. Slots 88–92 have second ends that are centered on a second line that extends the length of the lens sleeve 82. The vertical distances between the ends of each slot 88–92 limit the vertical distances that the lens holders 70–74, and therefore the lenses 60–68, can travel.

Lens sleeve 82 is further formed so that the angular inclines of the slots 88, 90 and 92 are different. When the pins 76 and 78 move within slots 88 and 90, respectively, the vertical distance between first and second lenses 60 and 62, respectively, and third lens 64 changes. Similarly, when pins 78 and 80 move within slots 90 and 92, respectively, the vertical distance between third lens 64 and fourth and fifth lenses 66 and 68, respectively, changes. Similarly, movement of the pins 76 and 80 within the slots 88 and 92 results in a change in the vertical distance between first and second lenses 60 and 62, respectively, and fourth and fifth lenses 66 and 68, respectively. Thus, the lenses 60–68 move with respect to each other when they move with respect to a fixed point on the main sleeve 52.

Figure 5:
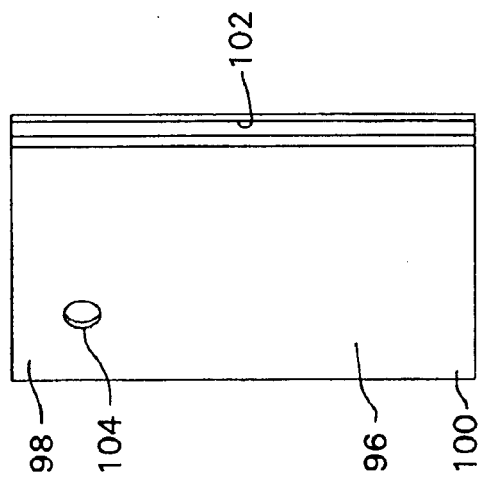
FIG. 5 is a side view of the drive sleeve of the power zoom coupler of FIG. 2.

As seen in FIGS. 2 and 5, a drive sleeve 96 fits between the main sleeve 52 and the lens sleeve 82. The drive sleeve 96 rotates within the coupler 38 about the longitudinal axis 54. Drive sleeve 96 has a proximal end 98 and a distal end 100. When the drive sleeve 96 is positioned in the coupler 38, the distal end 100 terminates above the fourth slot 94 of the lens sleeve 82. A longitudinal slot 102 extends through the drive sleeve 96 from the proximal end 98 to the distal end 100. A bore 104 extends through the proximal end 98 of the drive sleeve 96. Bore 104 is offset from the longitudinal slot 102 about the circumference of the drive sleeve 96 by approximately 90°. Drive sleeve 96 fits over the lens sleeve 82 such that the longitudinal slot 102 is aligned over slots 88–92.

Figure 7B:
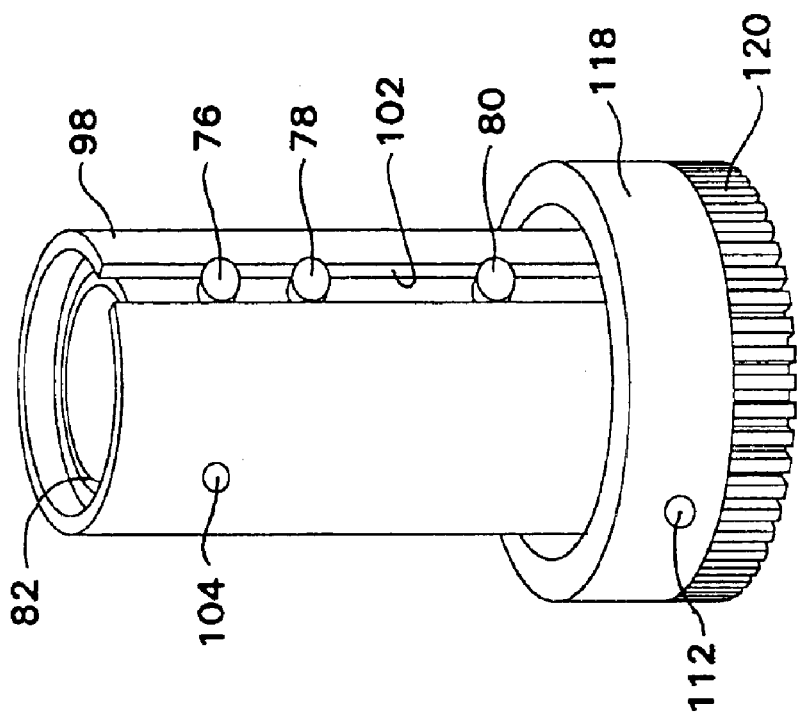
FIG. 7b is a side view of the focus assembly of the optical system of FIG. 2.
Figure 7A:
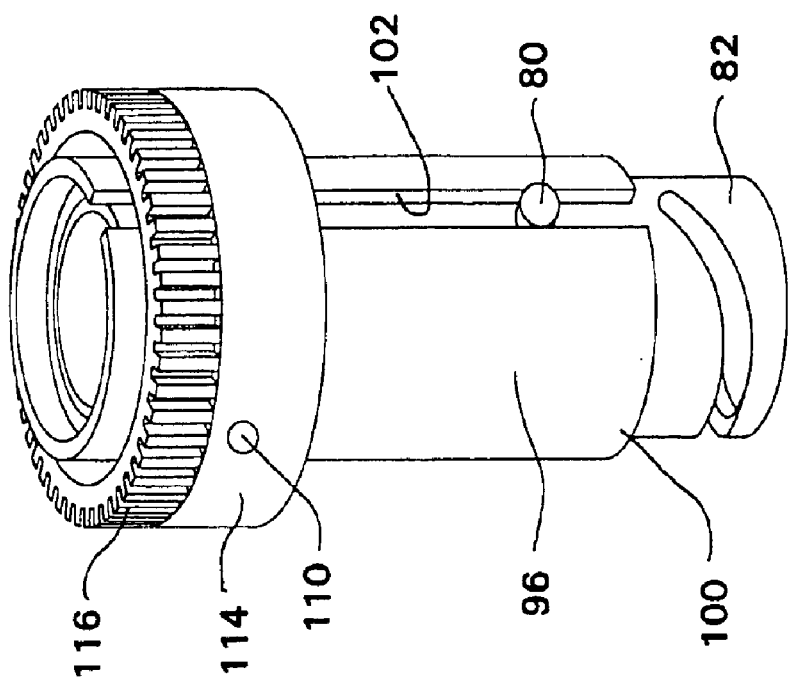
FIG. 7a is a side view of the zoom assembly of the optical system of FIG. 2.

Referring to FIGS. 7a and 7b, it can be seen that pins 76–80 extend through the longitudinal slot 102 of the drive sleeve 96. Rotation of the drive sleeve 96 causes the pins 76–80 to move within the slots 88–92 and rotate with respect to the lens sleeve 82. Rotation of the pins 76–80 causes a corresponding rotation of the lens holders 70–74. When the lens holders 70–74 rotate, the lenses 60–68 move with respect to the main sleeve 52. Since the slots 88–92 have varying angular inclines, the lenses 60–68 move with respect to each other.

As indicated above, when the lenses 60–68 move with respect to each other and with respect to the main sleeve 52, the magnification of the image applied to the camera head transducer 29 is changed. The lenses 60–68 are re-oriented in this manner when the drive sleeve 96 rotates. Thus, the magnification, zoom, limits of the coupler 38 are defined by the rotational limits of the drive sleeve 96.

Figure 6:
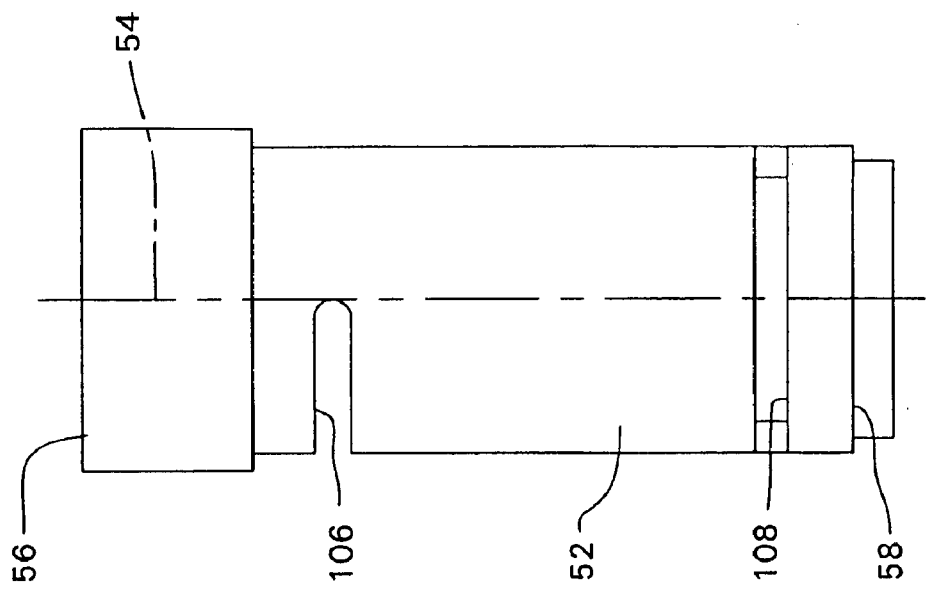
FIG. 6 is a side view of the main sleeve of the power zoom coupler of FIG. 2.

Returning to FIG. 2, the main sleeve 52 fits over the drive sleeve 96. The main sleeve 52 has a proximal end 56 and a distal end 58. Referring in addition to FIG. 6, a proximal slot 106 extends through the proximal end 56 of the main sleeve 52. Extending through the distal end 58 of the main sleeve 52 is a distal slot 108. Both the proximal slot 106 and the distal slot 108 are oriented perpendicular to the longitudinal axis 54. The proximal slot 106 extends around half the circumference of the main sleeve 52. The distal slot 108 also extends around half of the circumference of the main sleeve 52 and is offset from the proximal slot 106 by 90°.

When the coupler 38 is assembled, the bore 104 of the drive sleeve 96 is aligned with the proximal slot 106 of the main sleeve 52. Drive sleeve 96 is held on the main sleeve 52 by a pin 110 that extends through the proximal slot 106 and the bore 104. The drive sleeve 96 is thus coupled to the main sleeve 52 in a manner that prevents the drive sleeve 96 from translational movement with respect to the main sleeve 52.

Rotation of the pin 110 in the proximal slot 106 causes the drive sleeve 96 to rotate about the longitudinal axis 54. The drive sleeve 96 is sized such that the distal end 100 is located above main sleeve distal slot 108. The rotational limits of the drive sleeve 96 are determined by the arcuate circumference of the proximal slot 106. Since the proximal slot 106 extends around half of the main sleeve 52 in the depicted coupler 38, the drive sleeve 96 is able to rotate 180°.

A pin 112 extends through the distal slot 108 of the main sleeve 52 and into lens sleeve slot 94. Pin 112 thus holds the lens sleeve in the main sleeve 52. The pin 112 is able to travel within main sleeve distal slot 108. As the pin 112 moves, it acts on the surfaces of the lens sleeve 82 that define slot 94. When pin 112 is actuated, drive sleeve 96 is locked. Thus, the drive sleeve 96 prevents lens holder pins 76, 78 and 80 from moving. The lens holder pins 76, 78, and 80 thus serve as anti-rotation pins that prevent lens sleeve 82 from rotating. Consequently, when pin 112 moves against the adjacent surfaces of the lens sleeve 82, the surfaces thus function as camming surfaces. More particularly, since the lens sleeve cannot rotate, as a result of the force applied by pin 112, lens sleeve 82 is forced to move axially along the longitudinal axis 54. The longitudinal displacement of the lens sleeve 82 forces the lens holder pins 76, 78 and 80, the lens holders 70, 72 and 74 and the lenses 60–68 themselves to engage in a like motion.

The translational limits of the lens sleeve 82 are determined by the vertical distance between the first and second ends of the fourth slot 94.

When the lens sleeve 82 moves axially with respect to the drive sleeve 96, the pins 76–80 translate within the longitudinal slot 102. The lenses 60–68 therefore move axially in unison with the lens sleeve 82. As previously indicated, when the lenses 60–68 move with respect to the main sleeve 52, the image applied to transducer 29 is focused. Therefore, the optical focus limits of the coupler 38 are defined by the translational limits of the lens sleeve 82.

Returning to FIG. 3, a zoom adjustment ring 114 fits over the proximal end 56 of the main sleeve 52. The pin 110 extends from the bore 104 through the proximal slot 106 and terminates in the zoom adjustment ring 114. Therefore, the zoom adjustment ring 114 and the drive sleeve 96 rotate in unison about the longitudinal axis 54. A zoom ring gear 116 is attached to the zoom adjustment ring 114.

A focus adjustment ring 118 fits over the distal end 58 of the main sleeve 52. The pin 112 extends from the fourth slot 94 through the distal slot 108 of the main sleeve and terminates in the focus adjustment ring 118. The lens sleeve 82 will therefore be moved with the focus adjustment ring rotates. The focus adjustment ring 118 includes a focus ring gear 120.

A motor casing 122 fits over the main sleeve 52. Mounted in the motor casing 122 are a zoom motor assembly 126 and a focus motor assembly 136. The zoom motor assembly 126 includes a zoom gear box 130 that controls the output of a zoom motor 128. A zoom motor shaft 132 is connected to an opposite end of the zoom gear box 130. A zoom spur gear 134 is positioned about the zoom motor shaft 132. The zoom motor 128 is oriented such that the zoom spur gear 134 is adjacent the proximal end 56 of the main sleeve 52. The zoom spur gear 134 is configured to engage the zoom ring gear 116. Rotation of the zoom spur gear 134 causes a corresponding rotation of the zoom adjustment ring 114.

The focus motor assembly 136 is virtually identical to the zoom motor assembly 126. The focus motor assembly 136 includes a focus motor 138 that is connected to a focus gear box 140. The focus motor 138 also includes a focus motor shaft 142. A focus spur gear 144 is positioned about the focus motor shaft 142. The focus motor 138 is oriented such that the focus spur gear 144 is adjacent the distal end of the main sleeve. The focus spur gear 144 is configured to engage the focus ring gear 120. Rotation of the focus spur gear 144 causes a corresponding rotation of the focus adjustment ring 118.

The zoom motor 128 and the focus motor 138 are preferably relatively small, less than half an inch in height, to allow the coupler 38 of the present invention to be approximately the same size as prior art couplers. Motors of this size typically have a high shaft output, on the order of 100,000 rpm, but produce a relatively small amount of torque. Therefore, both the zoom gear box 130 and the focus gear box 140 include planetary gear trains. The planetary gear trains function as reduction gears that increase the amount of torque output for the zoom motor shaft 132 and the focus motor shaft 142. In addition, while any suitable motor could be used, the zoom motor 128 and the focus motor 138 are preferably three phase motors.

Figure 8:
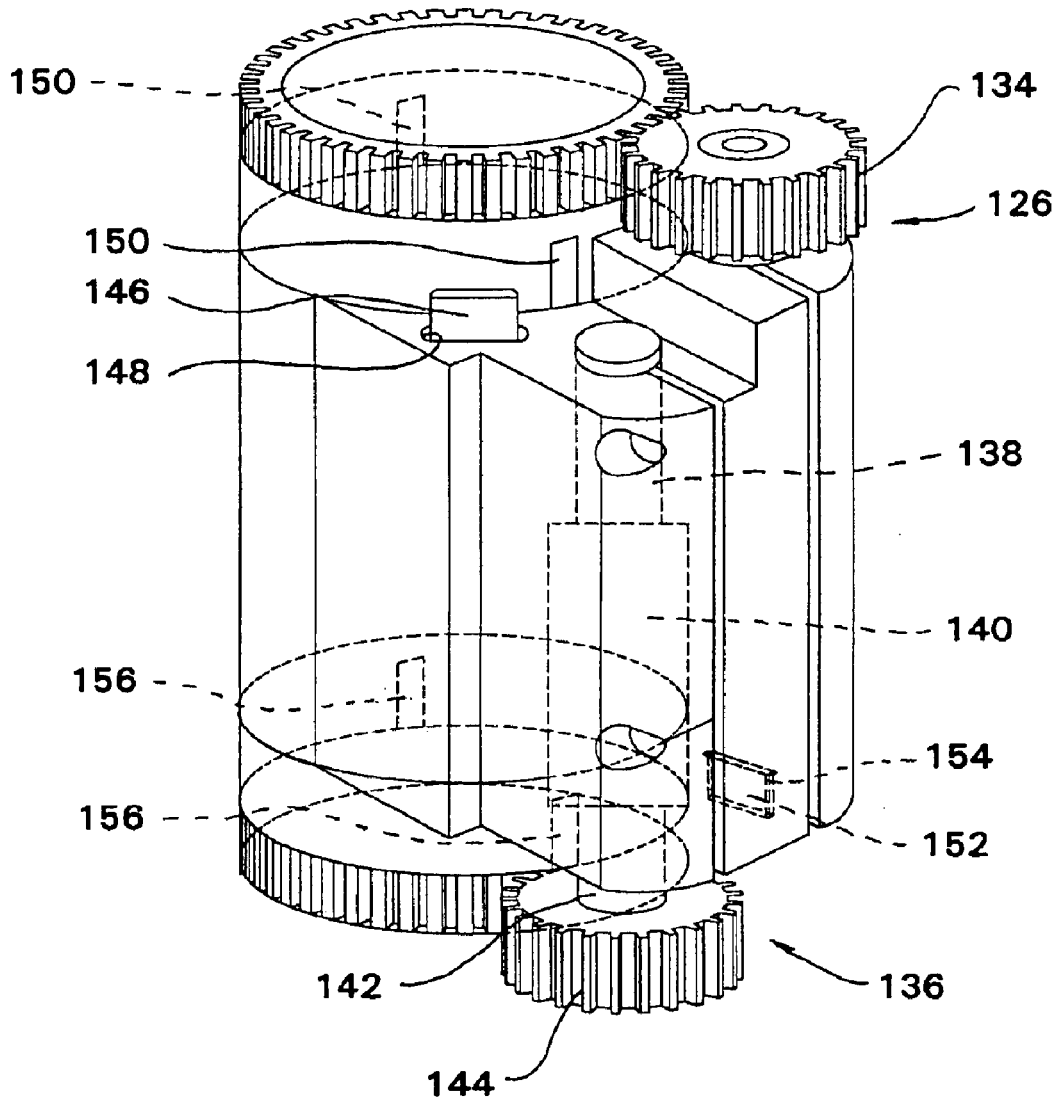
FIG. 8 is an isometric view of the motor casing and the main sleeve of the power zoom coupler of FIG. 2.

As best illustrated in FIG. 8, the coupler 38 includes sensors that detect the position of the lenses within the coupler 38. A zoom setting sensor 146 is positioned in a slot 148 in the motor casing 122 adjacent the zoom spur gear 134. A focus setting sensor 152 is positioned in a slot 154 in the motor casing 122 adjacent the focus spur gear 144. Both the zoom setting sensor 146 and the focus setting sensor 152 are electrically connected to the camera control unit 34. Sensors 146 and 152 output signals corresponding to the orientation of the lenses within the coupler 38 to the camera control unit 34 through this electrical connection. In one version of the invention, sensors 146 and 156 are Hall effect sensors. When the camera control unit 34 determines that the optical zoom and focus limits of the coupler 38 have been reached, the camera control unit may transmit data indicating this coupler state to the control center 42.

As depicted in FIG. 8, two magnets 150 are attached to the zoom adjustment ring 114. Magnets 150 are positioned to correspond to the optical zoom limits of the coupler 38. As the zoom adjustment ring 100 rotates, one of the magnets 150 approaches the zoom setting sensor 146.

When the zoom setting sensor 146 detects one of the magnets 150, it sends a signal to the camera control unit 34. The strength of this signal varies as a function of the proximity of the magnet 150 to sensor 146. Based upon this signal, the camera control unit 34 determines the position of the lenses 60–68 within the coupler 38. When the signal strength indicates that the lenses are at one of the optical zoom limits, the camera control unit 34 deactivates the zoom motor 128. The camera control unit 34 is still capable of activating the zoom motor 128 to drive the lenses 60–68 in the opposite direction.

Returning to FIG. 8, two magnets 156 are attached to the focus adjustment ring 118. Each magnet 156 is positioned in ring 118 so that its position relative to sensor 152 corresponds to the maximum extent that lens sleeve 82 can be moved in one direction. In other words, each magnet 156 is positioned such that the focus setting sensor 152 transmits an appropriate signal to the camera control unit 34 when one of the focus limits of the lenses 60–68 is reached.

The signal output by sensor 152 is transmitted to the camera control unit 34. Based on the state of this signal, camera control unit 34 determines the position of the lenses 60–68 within the coupler 38. When the signal strength indicates that the lenses are at an optical focus limit for the coupler 38, the camera control unit 34 de-activates the focus motor 138. The camera control unit 34 can no longer activate the focus motor 138 to further drive the lenses 60–68 in this direction. The camera control unit 34 is not prevented from activating the zoom motor 128 to drive the lenses 60–68 in the opposite direction.

Figure 9:
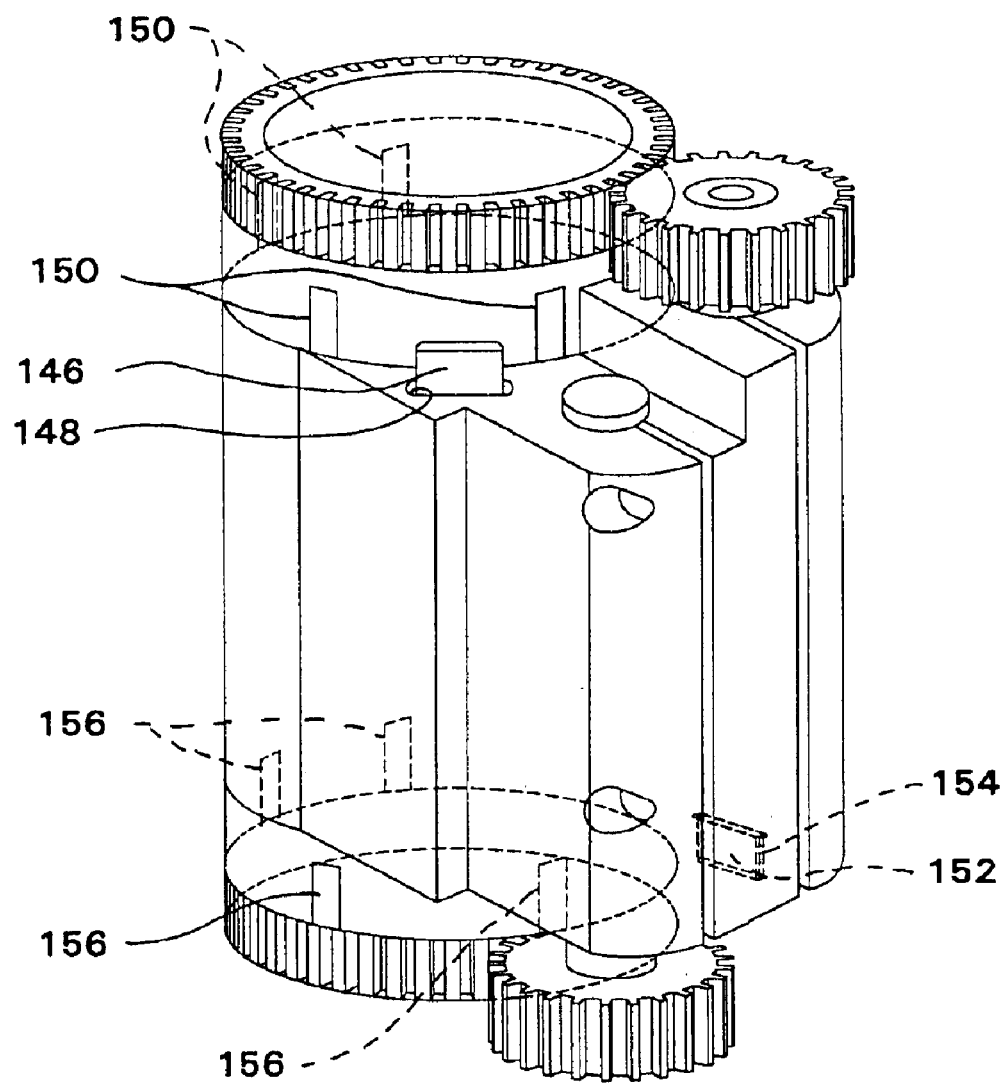
FIG. 9 is an isometric view of an alternate embodiment of the power zoom coupler of FIG. 2.

Alternatively, additional magnets could be positioned about the zoom adjustment ring 114 and the focus adjustment ring 118. In the FIG. 8 embodiment, the magnets attached to each ring can have the same magnetic strength. Referring now to FIG. 9, additional magnets of varying magnetic strengths could be included in the coupler 38. For instance, as illustrated in FIG. 9, a series of magnets of varying strength or polarity are positioned about either or both of the adjustment rings 114 and 118. The camera control unit 34 evaluates the strength of the signal transmitted by the setting sensors to determine orientation of the magnets at various points between the optical limits of the coupler 38.

For example, a number of additional magnets 150 could be positioned about the zoom adjustment ring 114 corresponding to increments of zoom. A first magnet could be placed at a position corresponding to 1.25 times magnification, a second magnet could be placed at 1.5 times, and so on. Rather than giving a zoom out or zoom in command, a surgeon could direct the coupler 38 to zoom to 1.5 times the magnification. In this case, the control center 42 signals the camera control unit 34 to actuate the zoom motor 128. The zoom setting sensor 146 transmits lens position signals to the coupler command center 40 based upon the proximity of each magnet 150. The strength of this signal is based upon the proximity of the magnets 150 and the detected magnetic strength of each of the magnets 150. The control center 42 signals the camera control unit 34 to de-activate the zoom motor 128 when the signals received from the sensor 146 correspond to the desired orientation of the lenses 60–68.

Figure 10:
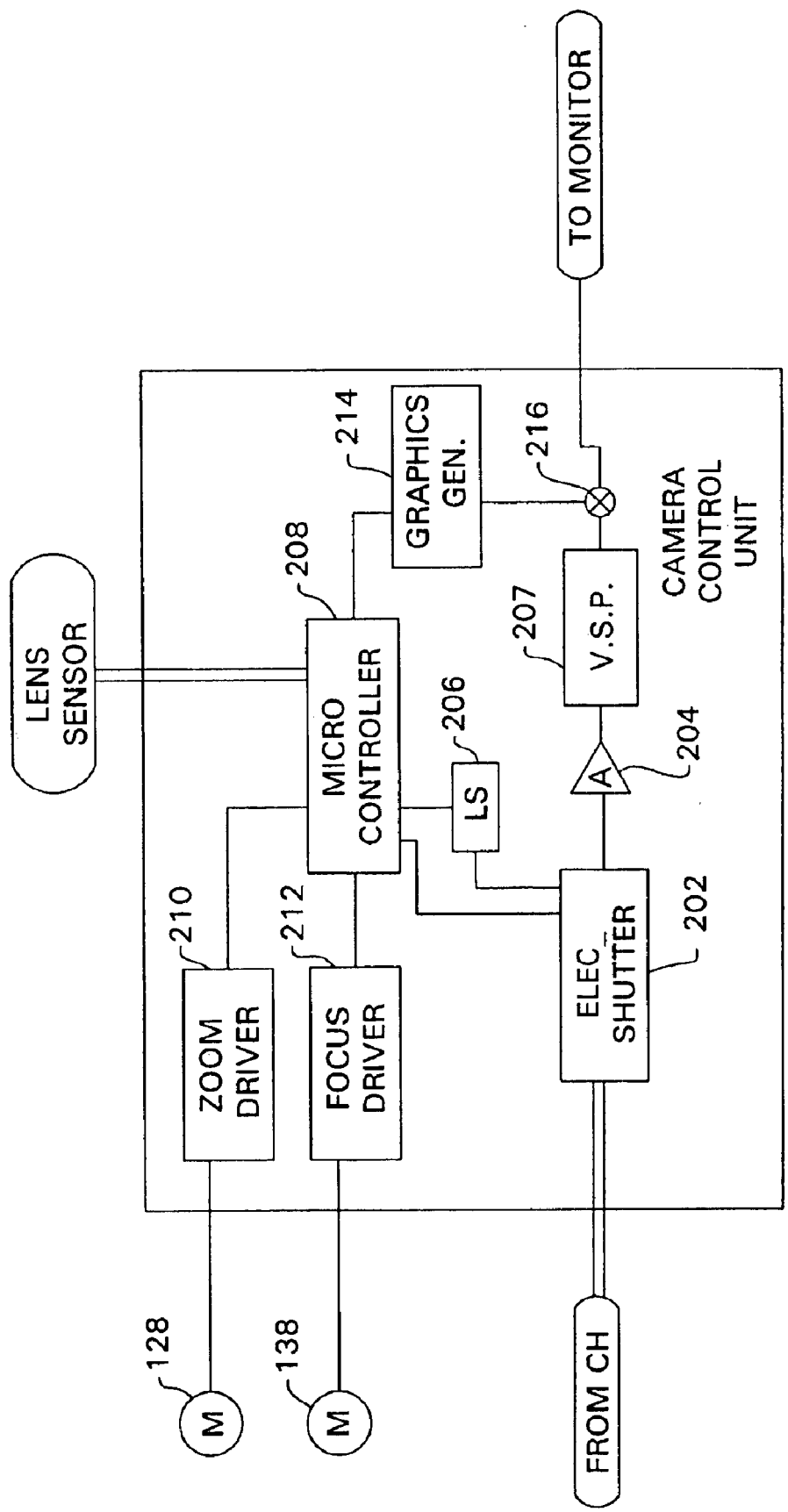
FIG. 10 is a schematic illustration of the sub-circuits of the camera control unit of FIG. 1.

The sub-circuits within the camera control unit 34 are described by reference to FIG. 10. Camera control unit 34 includes an electronic shutter 202. The electronic shutter gates, scans, the pixels integral with the CCDs integral with the camera head transducer 29 to obtain the charge held by each pixel. Based on the quantity of these charges, the electronic shutter 202 produces individual red/green/blue output signals representative of the components of the primary colors present in the captured images. These red/green/blue signals are individually amplified. In FIG. 10, a single amplifier 204 is shown as performing this amplification. It should be understood that there are separate amplifiers that selectively amplify/attenuate each primary color signal. Also, these amplifiers may be analog amplifiers that amplify the red/green/blue signals from transducer 29 before they are applied to the electronic shutter 202.

The camera control unit 34 also includes a light sensor circuit 206. The light sensor 206 receives an output signal from the electronic shutter assembly 202 representative of the light at the surgical site captured by the camera head 28.

The signals produced by amplifier 204 are applied to a video signal processor 207. Typically, video signal processor 207 is a digital signal processor. The video signal processor 207 can among other tasks, interpolate between individual pixel signals to produce a magnified portion of the captured image. The output signals from the video signal processor are the image-defining signals that are forwarded to the monitor 36.

The electronic shutter 202, the amplifier 204, the light sensor 206 and the video signal processor 207 are connected to a microcontroller 208. The light sensor 204 supplies the microcontroller 208 with the signal indicating the light level at the surgical site. Based on this input variable together with other variables, the microcontroller 208 both establishes the rate at which the electronic shutter 202 gates the pixels of the CCDs and establishes the extent to which the amplifier 204 amplifies/attenuates the red/green/blue signals. Microcontroller 208 also controls the video signal processing performed by the processor 207.

Microcontroller 208 also receives as input the output signals from the zoom setting and focus setting sensors 146 and 152, respectively. Internal to the camera control unit 34 there is also a zoom driver 210. The zoom driver 210 selectively applies an energization signal to the zoom motor 128. There is a focus driver 212. The focus driver 212 selectively applies the energization signals to the focus motor 138. The microcontroller 208 regulates the generation of motor energization signals by the zoom driver 210 and the focus driver 212.

The camera control unit 34 also has a graphics generator 214. This allows the camera control unit to display messages on monitor 36. The microcontroller 208 generates the commands to the graphics generator 214 causing the selected messages to be generated. In FIG. 10, the output signals produced by the graphics generator 214 are applied to the display signal output from the video signal processor 207 by a mixer 216.

Figure 11:
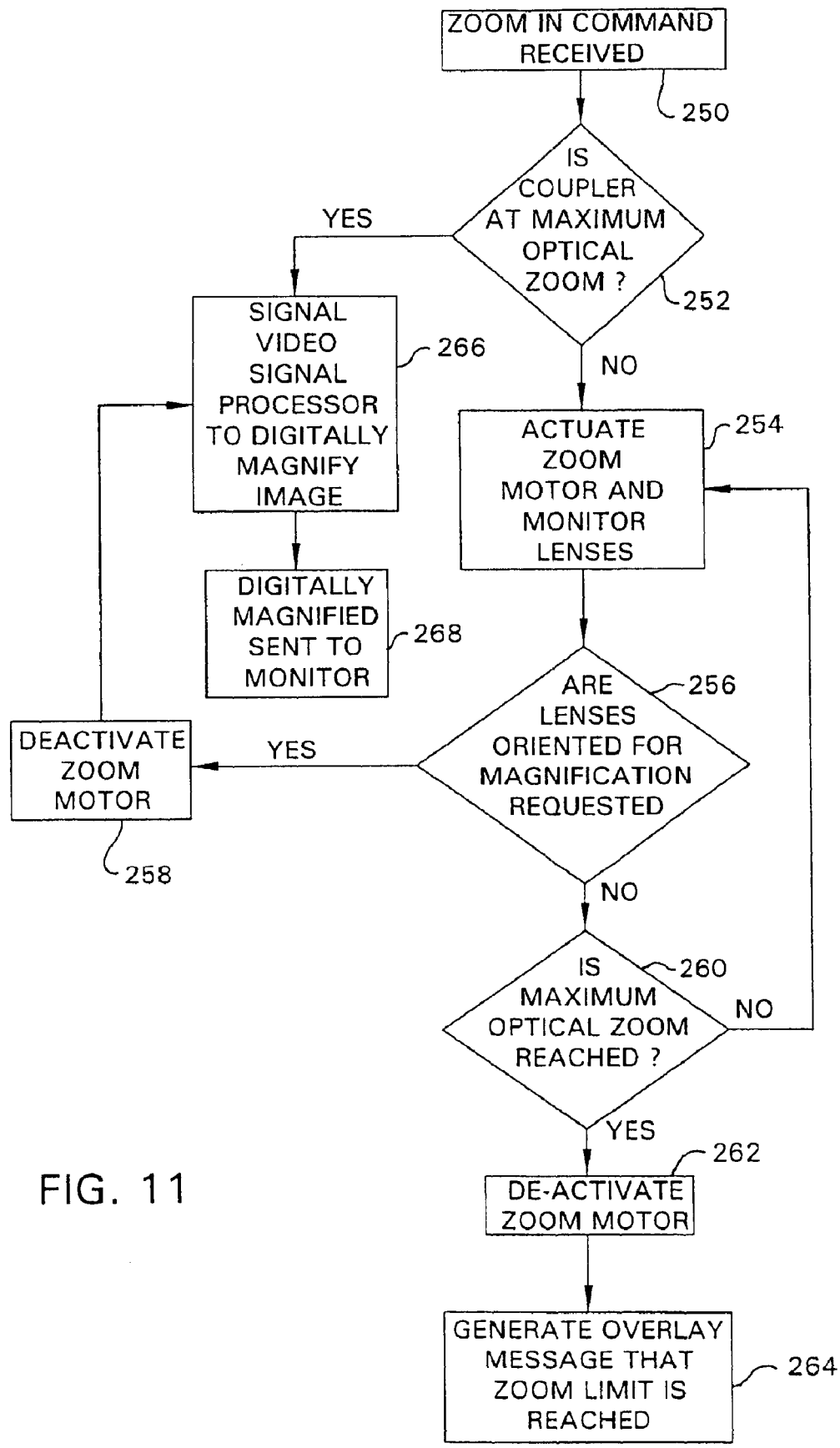
FIG. 11 is a control diagram of operation of the endoscopic viewing system of FIG. 1 when a zoom in command is received.
Figure 12:
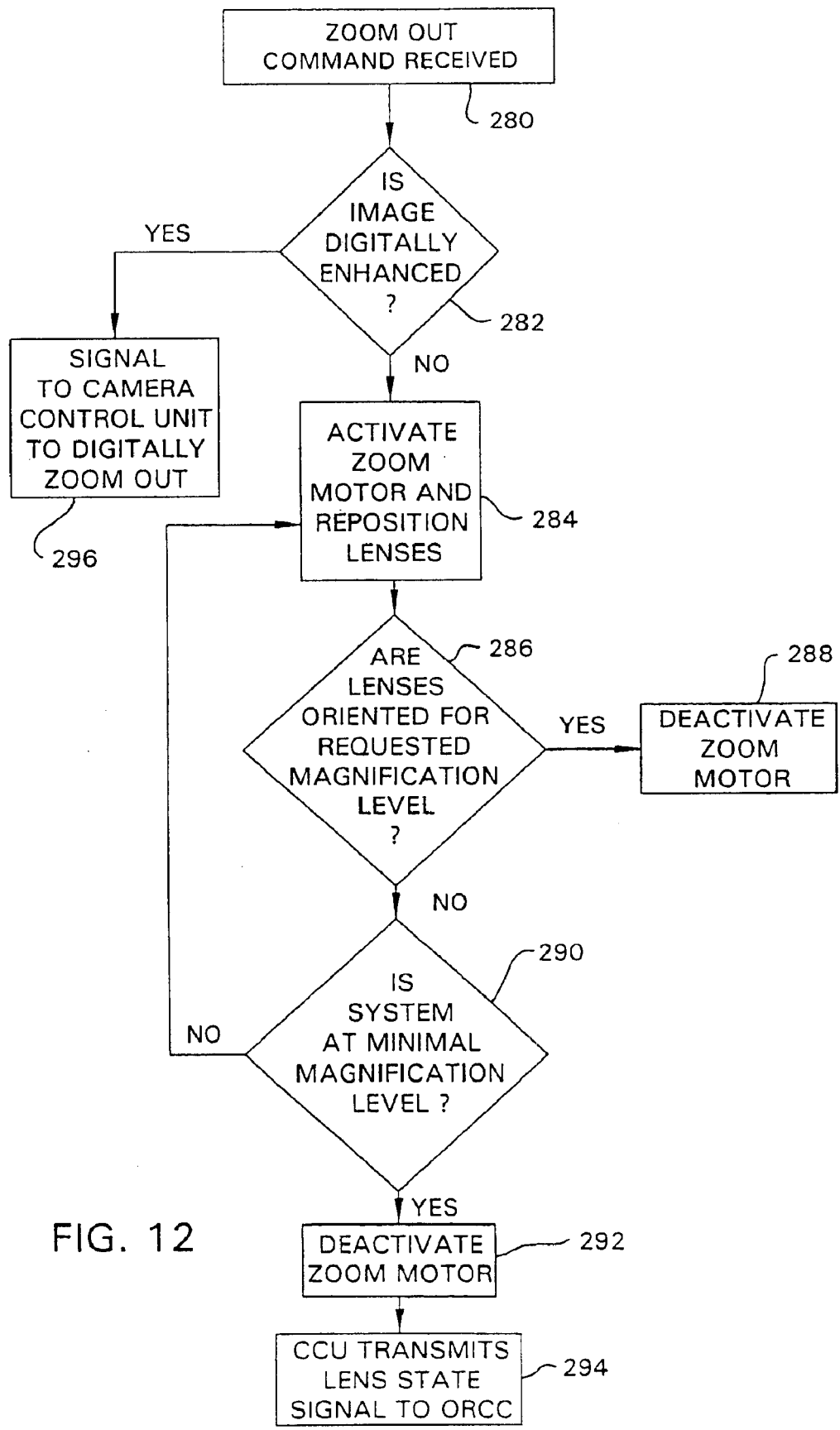
FIG. 12 is a control diagram of operation of the endoscopic viewing system of FIG. 1 when a zoom out command is received.
Figure 13:
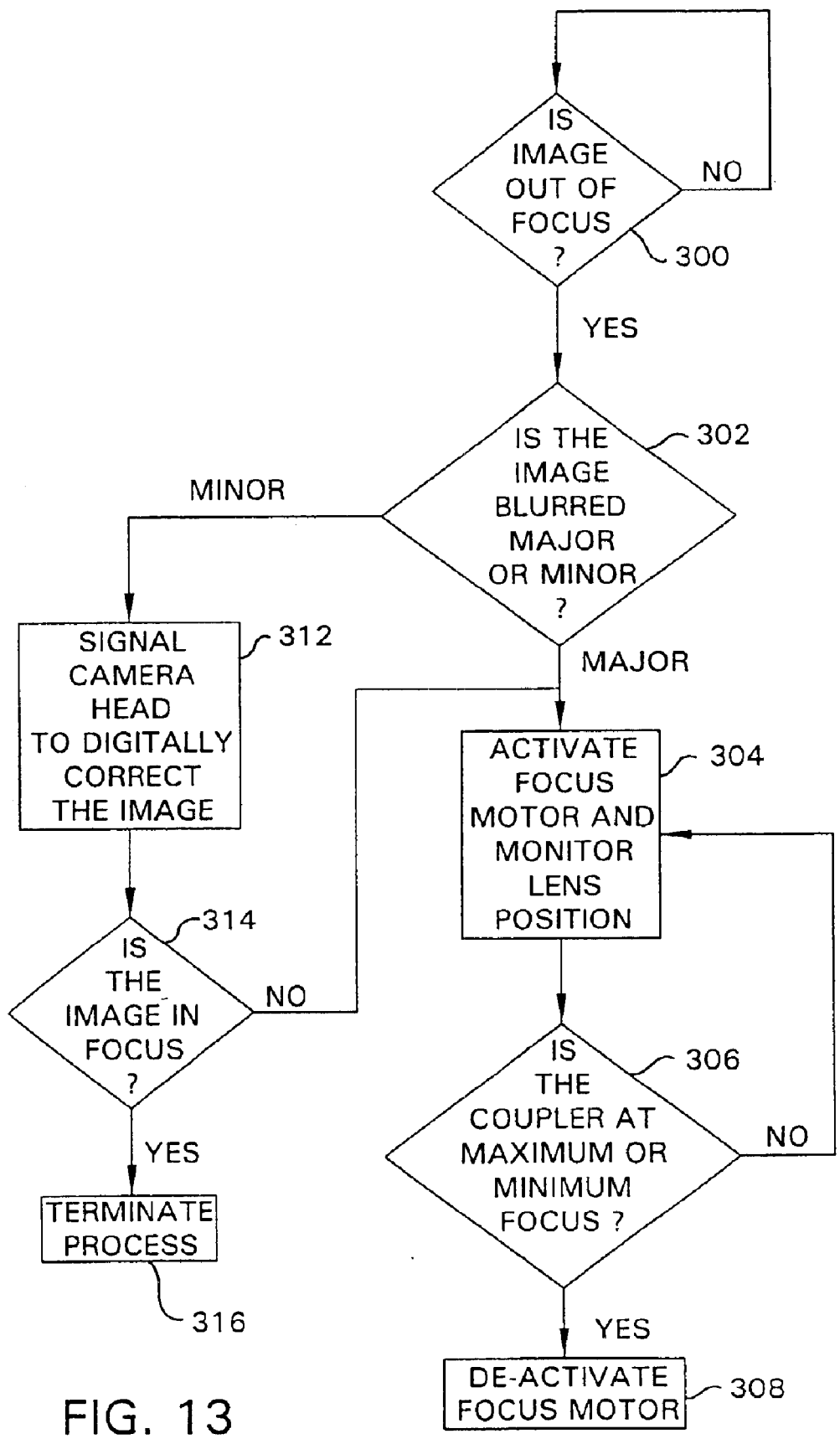
FIG. 13 is a control diagram of operation of the focus operation of the endoscopic viewing system of FIG. 1.

Referring to FIGS. 11–13, operation of the endoscopic viewing system 20 is described. FIG. 11 represents response of the endoscopic viewing system 20 to a command to magnify, zoom in on, the surgical site. Recall that the control center 42 disclosed herein can receive either touch-screen or voice generated commands. However, the coupler 38 of this invention could be utilized with a control center that receives commands in any suitable manner. In addition, at any time during the execution of a command, the surgeon can give a stop command, thus preventing the control center 42 from completing the action.

Referring to FIG. 11, a command to zoom in on the image of the surgical site displayed is received from the surgeon at step 250. In response to this command, the microcontroller 208 of the camera control unit 34 initially determines, at step 252, if the coupler 38 is oriented at maximum optical zoom. This determination is made by the microcontroller 208 based upon the output signals received from the zoom setting sensor 146. If the coupler is not at the maximum optical zoom position, the camera control unit 34, in step 254, applies an energization signal to the zoom motor 128.

As the position of the lenses 60–68 shift within the coupler 38, the microcontroller 208 of the camera control unit 34 receives a signal from zoom setting sensor 146. As this signal is received, microcontroller 208 first determines if the lenses 60–68 have been stepped to the desired magnification at step 256. This determination may be made by timing the period for which the zoom motor 128 is actuated. Alternatively, this determination may be made by determining if the signal from the zoom setting sensor 146 has indicated there has been a desired shift in the position of the lenses. If the lenses are properly repositioned, the microcontroller 208 signals the zoom driver 210 to de-activate the zoom motor 128, step 258.

If the lenses are not stepped to the desired orientation, the microcontroller 208 continues to evaluate the signal received from the zoom setting sensor 146 to determine if the lenses 60–68 are at their maximum zoom limit, step 260. If the signal indicates that the maximum zoom limit is reached, the camera control unit 34 performs two tasks. First, in step 262, the microcontroller 208 signals the zoom driver 210 to de-activate the zoom motor 128. This prevents excess wear on the motor 128 caused by driving the motor in a direction in which the zoom adjustment ring 114 can no longer be rotated. Next, in step 264, microcontroller 208 signals the graphics generator 214 to generate an overlay message indicating that the zoom limit has been reached. The graphics generator 214 applies a signal to the output display stream by the mixer 216, and the overlay message is displayed on the monitor 36. If the surgeon desires further magnification, he/she can enter a command requesting it through control center 42.

As clear from the above discussion, there are times when, as a result of the execution of step 252, the camera control unit 34 determines that the coupler lenses are in their maximum zoom position. If this state exists, microcontroller 208 signals the video signal processor 207 to digitally magnify the image applied to the monitor 36, step 266. The digitally magnified image is displayed on the monitor 36 at step 268. Camera control unit 34 can cause graphics generator 214 to present a message on the monitor 36 that the displayed image is digitally magnified.

Referring now to FIG. 12, the response of the endoscopic viewing system 20 to a command to zoom out on the surgical site is represented. A zoom out command is received by the control center 42 from the surgeon at step 280 and, in this step transmitted to the camera control unit 34. In step 282, the microprocessor 208, based on its internal control unit state flags, determines if the image being displayed on the monitor 36 is digitally magnified. If the image is not digitally magnified, microcontroller 208 signals the zoom driver 210 to activate the zoom motor 128, step 284. This causes the coupler lenses to be repositioned so as to reduce the magnification of the image applied to transducer 29.

As the coupler 38 optically adjusts the magnification of the image, the camera control unit 34 monitors the orientation of the lenses 60–68. The orientation of the lenses 60–68 is monitored based upon signals received from the zoom setting sensor 146 by the microcontroller 208. The microcontroller 208 evaluates this signal to determine the position of the lenses 60–68 within the coupler 38.

In step 286, the microcontroller 208 determines if the magnification of the image has been adjusted to the desired level. This determination may be made by timing how long motor 128 is driven. Alternatively, this determination is made by evaluating the extent the coupler lenses have moved based on the change in the output signal from zoom setting sensor 146. If the magnification is appropriately reduced, microcontroller 208 signals the zoom driver 210 to deactivate the zoom motor 128, step 288.

If the magnification has not been altered to the desired level, the microcontroller 208 will continue to monitor the position of the lenses within the coupler 38 by the signals received from the sensor 146.

At step 290, the microcontroller 208 evaluates the signal from the zone setting sensor 146 and determines if the minimum optical magnification limit of the lenses 60–68 is reached. If the signal indicates that the minimum zoom limit is reached, the microcontroller 208 signals the zoom driver 210 to deactivate the zoom motor 128, step 292. An indicator can be provided for the surgeon that the minimum zoom limit has been reached at this time. The camera control unit 34 then transmits a lens state signal to the control center 42, step 294. If the minimum zoom limit is not reached, the microcontroller 208 continues to monitor the position of the lenses 60–68 within the coupler 38.

Returning to step 282, if the image has been digitally reprocessed, the control center 42 applies a command to the camera control unit 34 to reprocess the image, step 296. The image is then digitally reprocessed by the video processor 207. At this time, the microcontroller 208 signals the graphics generator 214 to provide an indicator to the surgeon that the zoom out function is performed digitally, rather than optically.

FIGS. 11 and 12 represent reaction of the endoscopic viewing system 20 when zoom in/zoom out commands are received by the camera control unit 34. System 20 can also re-focus the image presented on the monitor 36 either optically or electronically. This refocusing can occur as a result of monitoring performed by the camera control unit 34 or in response to a command received through control center 42.

FIG. 13 illustrates the steps executed by the system to autofocus the image presented on monitor 36. In step 300 microcontroller 208, based on signals representative of the image to be output generated by the video signal processor 207, determines whether or not the image is out of focus. This determination can be made by monitoring the energy level of the signals forming the image. When the image is first in focus, the surgeon may enter a command through the control center identifying this state. At this time, microprocessor 208 stores data indicating the image energy level. If the image goes out of focus, the energy level of the image-defining signals changes. This change in energy level is interpreted by the microprocessor 208 as an indication that the focus of the image has changed.

Alternatively, edge-detection software run by the video signal processor may monitor the sharpness of signals that define the edge between two items of the captured image. Typically, this software compares the brightness of individual portions of the image; adjacent portions across which there are large changes in brightness are considered to define an edge. If this software indicates an edge blur, it is recognized by the video signal processor or microcontroller as an indication that the image has gone out of focus.

If the microcontroller 208 determines that the image is not out of focus, no action is taken. Throughout the surgical procedure, the microcontroller 208 continues to monitor the focus of the image.

If the microcontroller 208 determines that the image is out of focus, it proceeds to step 302. In step 302, the microcontroller 208 determines if the image blur is minor or major. This determination may be made by evaluating the extent to which the energy level of the image-defining signals have changed. Specifically, a large change in energy level is recognized as an indication that the blurring is major. Alternatively, this determination may be made by evaluating the extent to which the monitored display signal-defined edge of the image has blurred.

If the image blur is major, the image is re-focused optically. The microcontroller 208 signals the focus driver 212 to actuate the focus motor 138, step 304. As the focus motor 138 operates, the microcontroller 208 monitors the position of the lenses. Based on the proximity of the focus magnets 156, the focus setting sensor 152 transmits a signal to the microcontroller 208 regarding the orientation of the lenses 60–68.

When the signal is received, the microcontroller 208 determines if one of the focus limits for the coupler 38 is reached, step 306. If a limit is not reached, the focus of the image is further optically adjusted. Alternatively, if the image goes back into focus, a command entered through the control center 42 will result in the deactuation of the focus motor and the movement of the coupler lenses, (step not identified). The microcontroller 208 continues to monitor the position of the lenses 60–68 based upon signals transmitted from the focus setting sensor 152. If one of the focus limits is reached, the microcontroller 208 signals the focus driver 212 to de-activate the focus motor 138 in step 308. At this time, the microcontroller 208 can signal the graphics generator 214 to display an indicator on the monitor 36 that the focus limit has been reached. This indicator could also be provided in another suitable form, such as by an audio message.

Returning to step 302, if the image blur is minor, the microcontroller 208 applies a signal to the camera head 28 to electronically enhance the image at step 312. As the image is electronically enhanced, the microcontroller 208 monitors the image sent to the monitor 36 to determine if it is in focus, step 314. If the image is in focus, in step 316 the microcontroller 208 signals the camera head 28 to terminate electronic enhancement of the image. If the image is not in focus, the microcontroller 208 actuates the focus motor 138 to reset the coupling lenses in order to optically refocus the lenses; step 304 is executed.

It should also be understood that the system 20 will proceed to execution of step 304 when the electronic focusing circuit reaches the point at which it can no longer improve the quality of the output display signals. The circuit may provide a feedback signal to microcontroller 208 when it reaches this state. Alternatively, by monitoring the commands it generates and forward to the focusing circuit, microcontroller 208 may internally determine when the focusing circuit has reached the state at which it can no longer improve image quality.

As indicated previously, the surgeon may wish to have the image focus further corrected. In this case, a focus command could be given from the surgeon. Thus, step 300 in FIG. 13 would be replaced by a command received by control center 42. Based on the specific command, for example, "ELECTRONIC FOCUS," the surgeon, through the control center 42 could first direct the camera control unit 34 to perform an electronic enhancement. Alternatively, in response to a "FOCUS IN" or "FOCUS OUT" command, the control center could direct the camera control unit 34 to selectively moves the coupler lenses towards or away from the endoscope 22.

It should be appreciated that the foregoing description is for the purposes of illustration only, and further alternative embodiments of this invention are possible without departing from the scope of the claims. For instance, sensors other than Hall effect sensors can be used to monitor the positions of the lenses. These sensors could include optical sensors that monitor the rotational positions of adjustment rings 114 or 118. Alternatively, potentiometers can be used to monitor ring position.

In addition, while the endoscopic viewing system 20 has been described for use with a control center 42 that can receive both touch-screen and voice commands, the present invention is not limited to those such a viewing system. For instance, the zoom and focus commands could also be input via movement of one or more switches or pedals that are operably connected to the control center 42.

In addition, while a lens system including particular individual lenses has been illustrated, any suitable lenses and/or lens system could be utilized. For instance, the depicted coupler 38 includes lenses 60–68 that are all re-oriented in response to both zoom and focus commands. Alternatively, the coupler 38 could include a first set of lenses that are moved to magnify an image and a second set of lenses that are moved to adjust focus of the image. Further, while the present invention has been illustrated including five lenses supported by three lens holders, this orientation could be altered.

Moreover, the control protocols that have been described should be understood to be illustrative and not limiting. For instance, there may be some versions of the system of this invention when it is desirable to first engage in digital enhancement, zooming, of an image before displacing the coupler lenses in order to reset the magnification of the image applied to transducer 29. In these versions of the invention, the "zoom out" process may start with the resetting the coupler lenses prior to the resetting of the digital enhancement of the display signals.

Similarly, in some versions of the invention, correction of the image when it is only minimally out of focus may be performed by the resetting of the coupler lenses. In these versions of the invention, the major refocusing may be performed by the video signal processing circuitry internal to the camera controller 34.

Also, the image processing of this system may not be sequential, first optical and then electrical, or the other way around. In some versions of the system, for example, refocusing may be accomplished by first a slight change of the electronic focus. If that change is unsuccessful in improving image quality, the system may engage in a small displacement of the coupler lenses followed by another execution of the electronic focus routine. The zooming in/out of the image may similarly be interleaved steps of displacing the lenses and readjusting the electronic focus.

Likewise, it should also be understood that there is no requirement that the coupler always be integral with the camera head. In some versions of the invention, the coupler may be a stand alone component. This may be useful for economic reasons since it makes it possible to use a single coupler with a number of different camera systems.

Thus, although particular preferred embodiments of the present invention have been disclosed in detail for illustrative purposes, it will be recognized that variations or modifications lie within the scope of the present invention and do not depart from the spirit of the invention, as set forth in the foregoing description and drawings, and in the following claims.

What is claimed is:

1. An endoscopic viewing system comprising:
    an endoscope, said endoscope having a proximal end that is located outside of a patient;
    a camera head located over the proximal end of said endoscope, said camera head having a transducer for receiving an optical endoscopic image and producing transducer output signals based on the image;
    a coupler located between the proximal end of said endoscope and said camera head, said coupler including:
        at least one lens for receiving an image from said endoscope, said lens being moveable relative to said camera head so that said lens applies a selectively modified version of the endoscope image to said transducer;
        a first motor attached to said at least one lens for selectively moving said lens relative to said transducer; and
        a first lens state sensor configured to monitor the position of said lens and that generates a first lens state signal representative of the position of said lens;
    a video signal circuit connected to receive the output signals from said transducer, said video signal circuit being configured to produce display signals for application to a monitor based on the received transducer output signals, said video signal circuit being configured to selectively produce display signals based on a received video signal processing command; and
    a camera control processor, said camera control processor connected to receive the first lens state signal from said first lens state sensor, to actuate said first motor and to provide a video signal processing command to said video signal circuit.

2. The endoscopic viewing system of claim 1, wherein:
    said lens is shaped so as to selectively magnify the endoscopic image said lens applies to said transducer, the extent to which said lens magnifies said image being a function of the position of said lens relative to said transducer, and said lens has a maximum magnification position at which the magnification of the applied endoscopic image is at a maximum; and
    said video signal circuit is configured to produce display signals that represent an enlargement of the image contained in the received transducer output signals based upon the received video signal processing command.

3. The endoscopic viewing system of claim 2, wherein said camera control processor is configured to:
    receive an externally generated command to increase the magnification of the display signal;
    upon receipt of the externally generated command to increase the magnification of the display signal, determine from said first lens state sensor if said lens is at the maximum magnification position;
    if said lens is not at the maximum magnification position, actuate said first motor to move said lens towards the maximum magnification position; and
    if said lens is at the maximum magnification position, to generate a video signal processing command to said video signal circuit so that said video signal circuit produces display signals that contain an enlargement of the image contained in the output transducer signals.

4. The endoscopic viewing system of claim 1, wherein:
    said lens is shaped so as to selectively focus the endoscopic image said lens applies to said transducer, the focused endoscopic image being a function of the distance of said lens from said transducer;
    said video signal circuit is configured to electronically focus the transducer output signals to produce the display signals based on a received command;
    said camera control processor or said video signal circuit is configured to monitor the extent to which the image defined by the display signals produced by said video signal circuit is in focus; and said camera control processor, based on the monitoring of the extent to which the image defined by the display signals is out of focus, is configured to selectively first actuate said first motor to move said lens towards or away from said transducer or generate a focus command to said video signal circuit.

5. The endoscopic viewing system of claim 4, wherein said camera control processor is configured so that:
when the monitoring of the extent to which the image defined by the display signals is out of focus indicates the image is out of focus to a first degree, said camera control processor generates the focus command to said video signal circuit; and
when the monitoring of the extent to which the image defined by the display signals is out of focus to a second degree, the second degree being more out of focus than the first degree, said camera control processor actuates said first motor to cause the position of said lens relative to said transducer to shift.

6. The endoscopic viewing system of claim 4, wherein said camera control processor is configured so that:
when the monitoring of the image defined by the display signals indicates the image is out of focus, said camera control unit generates said focus command to said video signal circuit; and
if subsequent monitoring of the image defined by the display signals indicates that the image is out of focus, said camera control unit actuates said first motor to cause the position of said lens relative to said transducer to shift.

7. The endoscopic viewing system of claim 1, wherein:
said coupler is provided with at least two lenses, said lenses being selected so that when said lenses engage in a first pattern of motion relative to said transducer, said lenses focus the endoscopic image on said transducer and when said lenses engage in a second pattern of motion relative to said transducer, said lenses selectively magnify the endoscopic image applied to said transducer;
said coupler is provided with a first linkage assembly that is attached to said lenses that is configured to move said lenses in the first pattern of motion, wherein said first linkage assembly includes a first linkage and has a defined range of motion, said first motor is attached to said first linkage for actuating said first linkage and moving said lenses in the first pattern of motion;
said first lens state sensor is configured to monitor said first linkage assembly and to generate said first lens state signal to indicate when said first linkage assembly has reached the limit of the range of motion of said assembly;
a second linkage assembly including a second linkage is fitted to said coupler and attached to said lenses and is configured to move said lenses in the second pattern of motion and the second linkage assembly has a defined range of motion;
a second motor is attached to said coupler and connected to said second linkage to actuate said second linkage so as to move said lenses in the second pattern of motion;
a second lens state sensor is attached to said coupler and configured to monitor said second linkage assembly and to generate a second lens state signal to indicate when said second linkage assembly has reached the limit of the range of motion of said assembly;
said camera control processor is connected to said second motor to actuate said second motor and to said second lens state sensor to receive said second lens state signal and is configured to:
selectively actuate said first motor based on the position of said first linkage assembly as indicated by said first lens state signal; and
selectively actuate said second motor based on the position of said second linkage assembly as indicated by said second lens state signal.

8. The endoscopic viewing system of claim 1, wherein said camera control processor is configured to:
receive externally generated commands to change the display signal produced by said video signal circuit; and
based on the externally generated commands, and the position of said lens relative to said transducer, in a select sequence actuate said first motor so as to cause the movement of said lens and generate said video signal processing command to said video signal circuit.

9. A method of displaying an image captured by an endoscope, said method including the steps of:
applying an endoscope image received from an endoscope to a transducer through a lens assembly attached to the endoscope, wherein the lens assembly has at least one lens that has a defined range of motion relative to the transducer, the at least one lens configured to selectively magnify the endoscope image applied to the transducer as a function of the distance of the at least one lens from the transducer;
monitoring the position of the at least one lens relative to the transducer;
with the transducer, converting the endoscope image applied to said transducer to transducer output signals;
applying the transducer output signals to a video signal circuit, the video signal circuit configured to selectively magnify the transducer output signals to produce display signals based on the transducer output signals;
applying the display signals to a monitor so that said monitor presents a display representing at least a portion of the endoscope image; and
selectively adjusting a magnification of the portion of the endoscope image presented on the monitor.

10. The method of displaying an image captured by an endoscope of claim 9, wherein the step of selectively adjusting the magnification of the portion of the endoscope image presented on the monitor comprises:
based on said monitoring of the at least one lens, determining the position of said lens relative to said transducer; and
based on said determination, in a select sequence resetting the position of said lens to reset the magnification of the endoscopic image applied to the transducer and readjusting the magnification of the transducer output signals performed by said video signal circuit.

11. The method of displaying an image captured by an endoscope of claim 10, wherein the magnification of the endoscope image presented on the monitor is increased by:
based on said monitoring, determining if the at least one lens has reached a limit of its range of motion beyond which the lens cannot be moved to increase the magnification of the endoscope image applied to the transducer;
if, in said determination step, it is determined that the at least one lens has not reached the limit of its range of motion, resetting the position of the lens to increase the magnification of the image applied to the transducer; and if, in said determination step, it is determined that the at least one lens has reached the limit of its range of motion, increasing the magnification of the transducer output signals performed by the video signal circuit.

12. The method of displaying an image captured by an endoscope of claim 10, wherein the magnification of the endoscope image presented on the monitor is decreased by:

based on said monitoring, determining if the at least one lens has reached a limit of its range of motion beyond which the lens cannot be moved to increase the magnification of the endoscope image applied to the transducer;

if, in said determination step, it is determined that the at least one lens has not reached the limit of its range of motion, resetting the position of the lens to decrease the magnification of the image applied to the transducer; and if, in said determination step, it is determined that the at least one lens has reached the limit of its range of motion, decreasing the magnification of the transducer output signals performed by the video signal circuit.

13. A method of displaying an image captured by an endoscope, said method including the steps of:

applying an endoscope image received from an endoscope to a transducer through a lens assembly attached to the endoscope, wherein the lens assembly has at least one lens that has a defined range of motion relative to the transducer, the at least one lens configured to focus the endoscope image applied to the transducer as a function of the distance of the at least one lens from the transducer;

monitoring the position of the at least one lens relative to the transducer;

with the transducer, converting the endoscope image applied to said transducer to transducer output signals;

applying the transducer output signals to a video signal circuit, the video signal circuit configured to selectively enhance the transducer output signals to produce display signals based on the transducer output signals;

monitoring the quality of the image represented by the display signals; and applying the display signals to a monitor so that said monitor presents a display representing at least a portion of the endoscope image.

14. The method of displaying an image captured by an endoscope of claim 13, wherein if, from said monitoring of the quality of the image represented by the display signals indicates that, over time there is decay in the quality of the image, selectively repositioning the at least one lens and adjusting the enhancement of the transducer output signals performed by the video signal circuit, wherein the sequence in which the at least one lens is repositioned and the video signal circuit signal performance is performed is a function of the extent of image decay, the position of the at least one lens and the current level of enhancement of the transducer output signals being performed by the video signal circuit.

15. The method of displaying an image captured by an endoscope of claim 14, wherein:

if said monitoring of the quality of the image represented by the display signals indicates there is a minor decay in image quality, the enhancement of the transducer output signals performed by the video signal circuit is adjusted; and if said monitoring of the quality of the image represented by the display signals indicates there is a major decay in image quality, the major decay being greater than the minor decay, the at least one lens is repositioned.

16. The method of displaying an image captured by an endoscope of claim 15, wherein:

after said readjustment of the enhancement of the transducer signals by the video signal circuit, the quality of the image represented by the display signals is subjected to subsequent monitoring; and if, from said subsequent monitoring of the quality of the image represented by the display signals, it is determined that the image quality has not improved to a select level, the at least one lens is repositioned.

17. An endoscope assembly including:

an endoscope, said endoscope having a proximal end that is located outside the body of a patient and a distal end; and a coupler, said coupler including:
a housing, said housing having opposed proximal and distal ends and a longitudinal axis;
a joining member attached to said housing and configured to releasably hold the distal end of said housing to the distal end of said endoscope;
at least two spaced apart lenses disposed in said housing along the longitudinal axis and positioned to receive an endoscope image from said endoscope, said lenses being moveable in said housing along the longitudinal axis wherein a first lens is shaped so that the movement of the first lens focuses the endoscope image directed toward the proximal end of said housing and the movement of a second lens selectively magnifies the endoscope image directed towards the proximal end of said housing;
a first drive assembly disposed in said housing and connected to said first lens for selectively moving said first lens along the longitudinal axis and a second drive assembly disposed in said housing and connected to said second lens for selectively moving said second lens along the longitudinal axis; and
a first motor attached to said housing and connected to said first drive assembly for selectively actuating said first drive assembly so as to cause movement of said first lens and a second motor attached to said housing and connected to said second drive assembly for selectively actuating said second drive assembly so as to cause movement of said second lens.

18. The endoscope assembly of claim 17, wherein:

said first and second lenses are collectively shaped so that movement of said lenses relative to each other and the movement of said lenses relative to said coupling assembly causes said lenses to change the magnification of the endoscope image and the movement of said lenses relative to said coupler while the lenses remain spaced apart a constant distance causes said lenses to change the focus of the endoscope image;

said first drive assembly is connected to said first and second lenses to move said lenses relative to said coupler and to move said lenses relative to each other; and said second drive assembly is connected to said first and second lenses to move said lenses relative to said coupler while holding said lenses a fixed distance apart from each other.

19. The endoscope assembly of claim 17, wherein:

said first and second lenses are collectively shaped so that movement of said lenses relative to each other and the movement of said lenses relative to said coupling assembly causes said lenses to change the magnification of the endoscope image and the movement of said lenses relative to said coupler while the lenses remain spaced apart a constant distance causes said lenses to change the focus of the endoscope image;

a lens sleeve, is disposed in said housing, said lens sleeve being centered on the longitudinal axis of said housing and being moveably secured in said housing to move longitudinally within said housing;

said first and second lenses are disposed in said lens sleeve and are moveably attached to said lens sleeve so as to be able to move longitudinally relative to each other and relative to said lens sleeve;

said first drive assembly is connected to said first and second lenses to move both said lenses relative to lens sleeve and relative to each other; and said second drive assembly is connected to said lens sleeve to move said lens sleeve longitudinally within said housing.

20. The endoscope assembly of claim 19, wherein:

said lens sleeve is formed with at least two helical slots;

separate pins extend from each of said first and second lenses, each said pin extends into a separate one of the slots of said lens sleeve and out of said lens sleeve; and said first drive assembly includes a drive sleeve that is rotatably fitted over said lens sleeve and is positioned to engage said lens pins so that, upon rotation of said drive sleeve, said drive sleeve forces said pins to move within the lens slots.

* * * * *